(12) United States Patent
Jiao

(10) Patent No.: US 10,142,804 B2
(45) Date of Patent: Nov. 27, 2018

(54) ALL-GROUP CALLING METHOD, SYSTEM, RELATED DEVICE AND COMPUTER STORAGE MEDIUM

(71) Applicant: ZTE Corporation, Shenzhen, Guangdong (CN)

(72) Inventor: Chaowu Jiao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/512,931

(22) PCT Filed: Feb. 3, 2015

(86) PCT No.: PCT/CN2015/072147
§ 371 (c)(1),
(2) Date: Mar. 21, 2017

(87) PCT Pub. No.: WO2016/045293
PCT Pub. Date: Mar. 31, 2016

(65) Prior Publication Data
US 2017/0303097 A1    Oct. 19, 2017

(30) Foreign Application Priority Data

Sep. 23, 2014  (CN) .......................... 2014 1 0489475

(51) Int. Cl.
*H04W 4/08*    (2009.01)
*H04W 4/90*    (2018.01)
(Continued)

(52) U.S. Cl.
CPC ............... *H04W 4/08* (2013.01); *H04W 4/06* (2013.01); *H04W 4/90* (2018.02); *H04W 68/02* (2013.01); *H04W 76/40* (2018.02); *H04W 76/50* (2018.02)

(58) Field of Classification Search
CPC .......... H04W 4/08; H04W 4/90; H04W 76/40
(Continued)

(56) References Cited

U.S. PATENT DOCUMENTS 6,677,874 B1 *  1/2004  Mallinson ........... H03M 1/0854
                                                341/136
6,757,531 B1 *  6/2004  Haaramo ........... H04M 3/42382
                                                340/7.1
(Continued)

FOREIGN PATENT DOCUMENTS

CN    1126016 A    7/1996
CN    1212598 A    3/1999
(Continued)

OTHER PUBLICATIONS

Supplementary European Search Report in European application No. 15845036.1, dated Jul. 5, 2017, 13 pgs.
(Continued)

*Primary Examiner* — Ankur Jain
(74) *Attorney, Agent, or Firm* — Cooper Legal Group, LLC

(57) ABSTRACT

An all-group calling method, system, related device and computer storage medium, the method comprising: setting an all-group calling number at a terminal; and in an emergency, the terminal jointly establishes, according to the all-group calling number, an all-group call between terminals via a base station or the base station and a core network.

4 Claims, 6 Drawing Sheets

(51) Int. Cl.
*H04W 76/50* (2018.01)
*H04W 4/06* (2009.01)
*H04W 76/40* (2018.01)
*H04W 68/02* (2009.01)

(58) Field of Classification Search
USPC .............................. 455/517, 518, 519, 521
See application file for complete search history.

(56) References Cited

U.S. PATENT DOCUMENTS

| | | | |
|---|---|---|---|
| 2008/0137680 A1* | 6/2008 | Santhanam | H04W 74/002 370/431 |
| 2013/0072183 A1 | 3/2013 | Steer | |
| 2013/0114399 A1 | 5/2013 | Qie | |
| 2015/0296481 A1* | 10/2015 | Yu | H04W 68/02 370/336 |
| 2015/0319593 A1 | 11/2015 | Steer et al. | |

FOREIGN PATENT DOCUMENTS

| | | |
|---|---|---|
| CN | 1364001 A | 8/2002 |
| CN | 1976378 A | 6/2007 |
| CN | 101127967 A | 2/2008 |
| CN | 101198107 A | 6/2008 |
| CN | 101521947 A | 9/2009 |
| CN | 102300168 A | 12/2011 |
| CN | 102340793 A | 2/2012 |
| CN | 102348222 A | 2/2012 |
| CN | 103260134 A | 8/2013 |
| EP | 2066135 A1 | 6/2009 |

OTHER PUBLICATIONS

International Search Report in international application No. PCT/CN2015/072147, dated Jun. 29, 2015, 3 pgs.

English Translation of the Written Opinion of the International Search Authority in international application No. PCT/CN2015/072147, dated Jun. 29, 2015, 15 pgs.

* cited by examiner

ALL-GROUP CALLING METHOD, SYSTEM, RELATED DEVICE AND COMPUTER STORAGE MEDIUM

TECHNICAL FIELD

The disclosure relates to the technical field of communications, and more particularly to a full call method and system for a broadband trunking system, a related device and a computer storage medium.

BACKGROUND

A trunking communication system is mainly arranged for scheduling in various specialized fields, such as fields of police, fire-fighting, port, oil-field, metro or the like. However, in some special scenarios such as a variety of large-scale natural disasters, wars or other emergencies, all legal users in the entire network system are needed to be subject to the unified scheduling, thereby utilizing the maximum scheduling capability of trunking. However, it is impossible to implement the unified scheduling of all legal users in the entire network system at present.

SUMMARY

In view of this, embodiments of the disclosure are intended to provide a method and system for a full call, a related device and a computer storage medium in a broadband trunking system. The problem that it is impossible to implement unified scheduling of all legal users in the entire network system in a conventional art can be solved.

To this end, the technical solutions of the embodiments of the disclosure are implemented as follows.

According to an aspect of the disclosure, the embodiments of the disclosure provide a method for a full call in a broadband trunking system. The method includes: initiating, by a terminal set with a full call group No., a full call request carrying the full call group No. to a base station, so as to cause the base station to establish the full call between the terminal and at least one other terminal with the full call group No.

According to another aspect of the disclosure, the embodiments of the disclosure further provide a terminal including setting module and a full call module. The setting module is configured to set a full call group No. The full call module is configured to initiate a full call request carrying the full call group No. to a base station, so as to cause the base station to establish the full call between the terminal and at least one other terminal with the full call group No.

In a particular embodiment, the terminal further includes an updating module configured to update the full call group No. upon triggering of the base station.

According to another aspect of the disclosure, the embodiments of the disclosure further provide a method for a full call in a broadband trunking system. The method includes: receiving, by a base station, a full call request, which is initiated by a terminal set with a full call group No. and carries the full call group No., and then detecting whether a port of the base station, which is connected with a core network, is normally connected; establishing, by the base station together with the core network, a full call between the terminal initiating the full call request and at least one other terminal with the full call group No. according to the full call request, when the port is normally connected; and establishing, by the base station itself, the full call between the terminal initiating the full call request and the at least one other terminal with the full call group No. according to the full call request, when the port is not normally connected.

In a particular embodiment, establishing, by the base station together with the core network, the full call between the terminal initiating the full call request and at least one other terminal with the full call group No. according to the full call request specifically includes: sending, by the base station, the full call request to the core network; receiving, by the base station, a paging message carrying the full call group No., for establishing a full call, from the core network; establishing, by the base station, a full call group of all the terminals carrying the full call group No.; receiving, by the base station, a request for establishing a full call carrying the full call group No. from the core network; and establishing, by the base station, the full call between the terminals in the full call group.

In a particular embodiment, establishing, by the base station itself, the full call between the terminal initiating the full call request and the at least one other terminal with the full call group No. according to the full call request specifically includes: sending to all terminals a paging message carrying the full call group No., for establishing a full call; establishing a full call group of all the terminals carrying the full call group No.; sending a full call configuration message carrying the full call group No. to the terminals in the full call group; and establishing the full call between the terminals in the full call group.

According to another aspect of the disclosure, the embodiments of the disclosure further provide a base station including a receiving module, a detection module, a processing module and an analogue core network module. The receiving module is configured to receive a full call request, which is initiated by a terminal set with a full call group No. and carries the full call group No. The detection module is configured to detect a port of the base station, which is connected with a core network, trigger the processing module when the port is normally connected, and trigger the analogue core network module when the port is not normally connected. The processing module is configured to establish a full call between the terminal initiating the full call request and at least one other terminal with the full call group No. according to the full call request together with the core network. The analogue core network module is configured to establish the full call between the terminal initiating the full call request and the at least one other terminal with the full call group No. according to the full call request.

In a particular embodiment, the processing module is specifically configured to send the full call request to the core network; receive from the core network a paging message carrying the full call group No., for establishing a full call; establish a full call group of all the terminals carrying the full call group No.; receive a request for establishing a full call carrying the full call group No. from the core network; and establish the full call between the terminals in the full call group.

In a particular embodiment, the analogue core network module is specifically configured to send to all terminals a paging message carrying the full call group No., for establishing a full call; establish a full call group of all the terminals carrying the full call group No.; send a full call configuration message carrying the full call group No. to the terminals in the full call group; and establish the full call between the terminals in the full call group.

According to another aspect of the disclosure, the embodiments of the disclosure further provide a method for a full call in a broadband trunking system. The method includes: sending, by a core network, a paging message carrying a full call group No., for establishing a full call, to all terminals through a base station; establishing, by a core network, a full call group of all terminals carrying the full call group No.; sending, by a core network, a full call configuration message carrying the full call group No. to the terminals in the full call group through the base station; and establishing, by a core network, a full call between the terminals in the full call group.

In a particular embodiment, the method further includes: triggering, by the core network, all the terminals carrying the full call group No. to update the full call group No. through the base station.

According to another aspect of the disclosure, the embodiments of the disclosure further provide a core network including a paging module and a full call module. The paging module is configured to send a paging message carrying a full call group No., for establishing a full call, to all terminals through a base station; and establish a full call group of all terminals carrying the full call group No. The full call module is configured to send a full call configuration message carrying the full call group No. to the terminals in the full call group through the base station; and establish a full call between the terminals in the full call group.

In a particular embodiment, the core network further includes an updating initiation module configured to trigger all the terminals carrying the full call group No. to update the full call group No. through the base station.

According to another aspect of the disclosure, the embodiments of the disclosure further provide a system for a full call in a broadband trunking system, including the above-mentioned terminal and any of base stations.

The embodiments of the disclosure further provide a computer storage medium in which computer executable instructions are stored for execution of the above-mentioned method for the full call in the broadband trunking system.

According to the technical solutions of the embodiments of the disclosure, the full call group No. is set on the terminal, and in an emergency, the terminal establishes the full call between the terminals according to the full call group No. by the base station itself or by the base station together with the core network, thus the unified scheduling of all legal users in the entire network system is achieved and a scheduling capability of trunking is utilized more effectively.

DETAILED DESCRIPTION

Particular embodiments of the disclosure will be specifically described below with reference to the drawings. The drawings form a part of the disclosure, and are adopted to explain principles of the disclosure together with the embodiments of the disclosure. For purposes of clarity and simplification, specific detailed descriptions about known functions and structures in devices described in the disclosure will be omitted, if they may make the subject matters of the disclosure ambiguous.

A main purpose of the embodiments of the disclosure is to provide a method and system for a full call in a broadband trunking system, a related device and a computer storage medium. A full call group No. is set on a terminal, and in an emergency, the terminal establishes a full call between terminals according to the full call group No. by a base station itself (that is, the base station itself implements establishment under the condition that the base station and a core network are disconnected or under another system-soft condition) or by the base station together with the core network (that is, the base station and the core network together implement establishment under the condition that the base station and the core network work normally), or may also directly implement the full call of the terminals in the entire network according to the full call group No. by the core network. With the technical solutions of the embodiments of the disclosure, the unified scheduling of all legal users in the entire network system is achieved and a scheduling capability of trunking is utilized more effectively.

The technical solutions of the disclosure will be described below with some specific embodiments in detail.

Figure 1:
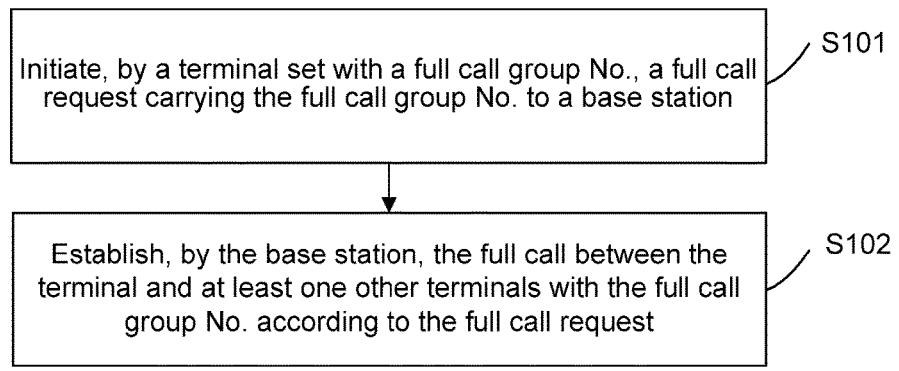
FIG. 1 is a flowchart of a full call method for a broadband trunking system according to an embodiment of the disclosure.

FIG. 1 is a flowchart of a full call method for a broadband trunking system according to an embodiment of the disclosure. As shown in FIG. 1, the method mainly includes the following steps.

At Step S101: a terminal set with a full call group No. initiates a full call request carrying the full call group No. to a base station.

The full call group No. in the embodiments of the disclosure is a special identity of the terminal. In the embodiments of the disclosure, a unified full call group No. is set for different terminals (or different full call group Nos. are set for different terminals, the full call group Nos. of multiple terminals form a sequence, and under such a condition, each terminal and a core network are required to store the full call group Nos. of all the other terminals) for making a full call to all the terminals set with the full call group No. through the terminals or the core network in some special scenarios, such as various large-scale natural disasters, wars or other emergencies, thus the unified scheduling of all legal users in the entire network system is achieved and a scheduling capability of trunking is utilized more effectively.

For specific setting of the full call group No., those skilled in the art may freely implement setting according to a practical requirement. For example, it is fixedly set on a terminal (for example, fixedly set on a processor of the terminal) when it leaves a factory, or is set on a Subscriber Identity Module (SIM) card, and so on.

At Step S102: the base station establishes the full call between the terminal and at least one other terminal with the full call group No. according to the full call request.

That is, in an emergency, when the system is under a fail-soft condition, the terminal may initiate the full call request to the base station, thereby establishing the full call between multiple terminals.

Specifically, a specific implementation for initiating by the terminal the full call request to the base station may be that: a full call key is set on the terminal, or a full call contact entry or the like is set in a contact list of the terminal, and the full call key or the full call contact entry on the terminal is operated to trigger the terminal to initiate the full call request to the base station.

The terminal of the embodiments of the disclosure may further update the full call group No. under triggering of the base station. With the method of the embodiments, it is effectively ensured that a conflict is eliminated by simply updating the full call group No. in case of the conflict of the full call group Nos. or in other emergencies, thereby better ensuring establishment of the full call.

The terminal of the embodiments of the disclosure is any terminal capable of realizing a call function, such as a mobile phone. In the disclosure, the terminal set with the full call group No. initiates the full call request carrying the full call group No. to the base station, so as to cause the base station to establish the full call between the terminal and the at least one other terminal with the full call group No.

The embodiment of the disclosure further describes a computer storage medium in which a computer program is stored for execution the method for the full call shown in FIG. 1 in the embodiments of the disclosure.

Figure 2:
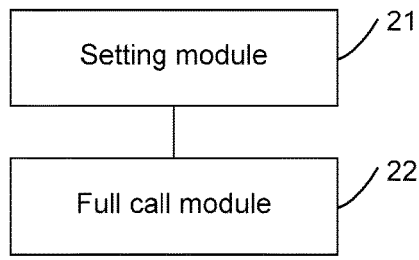
FIG. 2 is a structure diagram of a terminal according to an embodiment of the disclosure.

FIG. 2 is a structure diagram of a terminal according to an embodiment of the disclosure. As shown in FIG. 2, the terminal includes a setting module 21 and a full call module 22.

The setting module 21 is configured to set a full call group No.

The full call module 22 is configured to initiate a full call request carrying the full call group No. to a base station so as to cause the base station to establish the full call between the terminal and at least one other terminal with the full call group No.

In the embodiment of the disclosure, each of the setting module 21 and full call module 22 in the terminal may be implemented by a Central Processing Unit (CPU), a Digital Signal Processor (DSP) or a Field Programmable Gate Array (FPGA) in the terminal during a practical application.

Figure 3:
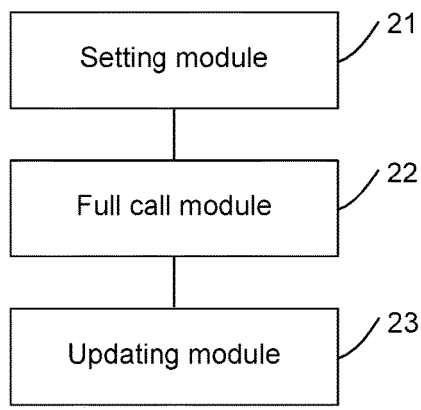
FIG. 3 is a structure diagram of another terminal according to an embodiment of the disclosure.

FIG. 3 is a structure diagram of another terminal according to an embodiment of the disclosure. Compared with FIG. 2, the terminal further includes an updating module 23.

The updating module 23 is configured to update the full call group No. upon triggering of the base station.

As a specific implementation, a core network triggers updating modules 23 on all terminals carrying the full call group No. in the network to update the full call group No. on the corresponding terminals through the base station.

In the embodiment of the disclosure, the updating module 23 in the terminal may also be implemented by the CPU, DSP or FPGA in the terminal during the practical application.

Figure 4:
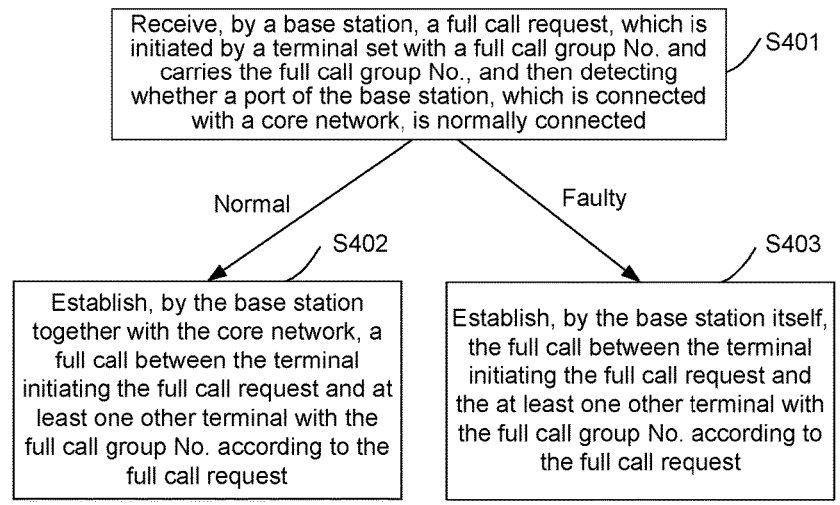
FIG. 4 is a flowchart of another full call method for a broadband trunking system according to an embodiment of the disclosure.

FIG. 4 is a flowchart of another method for a full call in a broadband trunking system according to an embodiment of the disclosure. As shown in FIG. 4, the method includes the following steps.

Step S401: a base station receives a full call request, which is initiated by a terminal set with a full call group No. and carries the full call group No., and then detects whether a port of the base station, which is connected with a core network, is normally connected, Step S402 is executed if the port is normally connected, and otherwise Step S403 is executed.

At Step S402: the base station establishes a full call between the terminal initiating the full call request and at least one other terminal with the full call group No. according to the full call request together with the core network.

Specifically, the base station sends the full call request to the core network, receives a paging message carrying the full call group No., for establishing a full call, from the core network, establishes a full call group of all the terminals carrying the full call group No., receives a request for establishing a full call carrying the full call group No. from the core network, and establishes the full call between the terminals in the full call group.

At Step S403: the base station itself establishes the full call between the terminal initiating the full call request and the at least one other terminal with the full call group No. according to the full call request.

In a particular embodiment, an analogue core network module of the base station establishes the full call between the terminal initiating the full call request and the at least one other terminal with the full call group No. according to the full call request.

Specifically, the analogue core network module sends to all terminals the paging message carrying the full call group No., for establishing the full call, establishes the full call group of all the terminals carrying the full call group No., sends a full call configuration message carrying the full call group No. to the terminals in the full call group, and establishes the full call between the terminals in the full call group.

The embodiment of the disclosure further describes a computer storage medium in which a computer program is stored for execution of the method for a full call shown in FIG. 4 in the embodiment of the disclosure.

Figure 5:
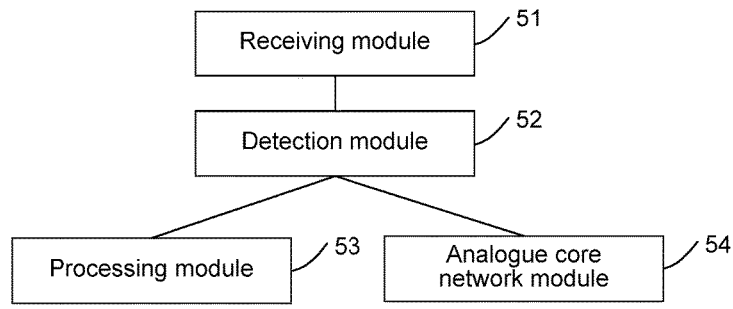
FIG. 5 is a structure diagram of a base station according to an embodiment of the disclosure.

FIG. 5 is a structure diagram of a base station according to an embodiment of the disclosure. As shown in FIG. 5, the base station includes a receiving module 51, a detection module 52, a processing module 53 and an analogue core network module 54.

The receiving module 51 is configured to receive a full call request, which is initiated by a terminal set with a full call group No. and carries the full call group No.

The detection module 52 is configured to detect a port of the base station, which is connected with a core network, trigger the processing module 53 when the port is normally connected, and trigger the analogue core network module 54 when the port is not normally connected.

The processing module 53 is configured to establish a full call between the terminal initiating the full call request and at least one other terminal with the full call group No. according to the full call request together with the core network.

The analogue core network module 54 is configured to establish the full call between the terminal initiating the full call request and the at least one other terminal with the full call group No. according to the full call request.

In a particular embodiment, the processing module 53 is specifically configured to: send the full call request to the core network; receive from the core network a paging message carrying the full call group No., for establishing a full call; establish a full call group of all the terminals carrying the full call group No.; receive a request for establishing a full call carrying the full call group No. from the core network; and establish the full call between the terminals in the full call group.

The analogue core network module 54 is specifically configured to: send to all terminals a paging message carrying the full call group No., for establishing a full call; establish a full call group of all the terminals carrying the full call group No.; send a full call configuration message carrying the full call group No. to the terminals in the full call group; and establish the full call between the terminals in the full call group.

In the embodiment of the disclosure, each of the receiving module 51, the detection module 52, the processing module 53 and the analogue core network module 54 in the base station may be implemented by a CPU, a DSP or an FPGA in the base station during a practical application.

The embodiment of the disclosure further provides a method for a full call in a broadband trunking system including: sending, by a core network, a paging message carrying a full call group No., for establishing a full call, to all terminals through a base station; establishing, by a core network, a full call group of all terminals carrying the full call group No.; sending, by a core network, a full call configuration message carrying the full call group No. to the terminals in the full call group through the base station; and establishing, by a core network, a full call between the terminals in the full call group.

The embodiment of the disclosure further describes a computer storage medium in which a computer program is stored for execution of the methods for the full call in the above-mentioned embodiments.

In a particular embodiment, the core network in the embodiments of the disclosure may further trigger all the terminals carrying the full call group No. to update the full call group No. through the base station.

Figure 6:
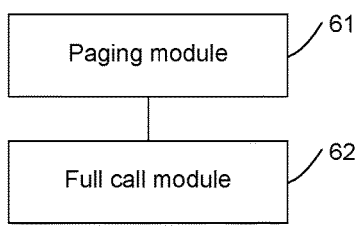
FIG. 6 is a structure diagram of a core network according to an embodiment of the disclosure.

FIG. 6 is a structure diagram of a core network according to an embodiment of the disclosure. As shown in FIG. 6, the core network includes a paging module 61 and a full call module 62.

The paging module 61 is configured to send a paging message carrying a full call group No., for establishing a full call, to all terminals through a base station, and establish a full call group of all terminals carrying the full call group No.

The full call module 62 is configured to send a full call configuration message carrying the full call group No. to the terminals in the full call group through the base station, and establish a full call between the terminals in the full call group.

In the embodiment of the disclosure, each of the paging module 61 and the full call module 62 in the core network may be implemented by a CPU, a DSP or an FPGA in equipment, to which the core network belongs, during a practical application.

Figure 7:
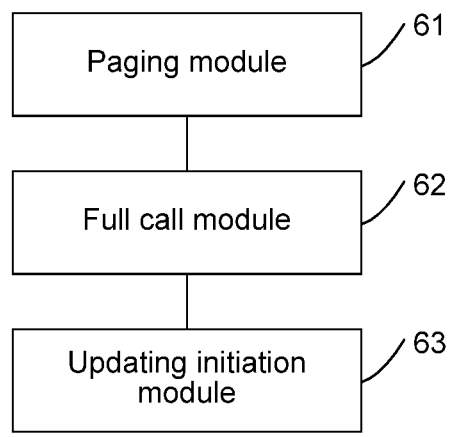
FIG. 7 is a structure diagram of another core network according to an embodiment of the disclosure.

FIG. 7 is a structure diagram of another core network according to an embodiment of the disclosure. Compared with FIG. 6, the core network in the embodiment of the disclosure further includes an updating initiation module 63.

The updating initiation module 63 is configured to trigger all the terminals carrying the full call group No. to update the full call group No. through the base station.

In the embodiment of the disclosure, the updating initiation module 63 in the core network may be implemented by the CPU, the DSP or the FPGA in the equipment, to which the core network belongs, during the practical application.

Figure 8:
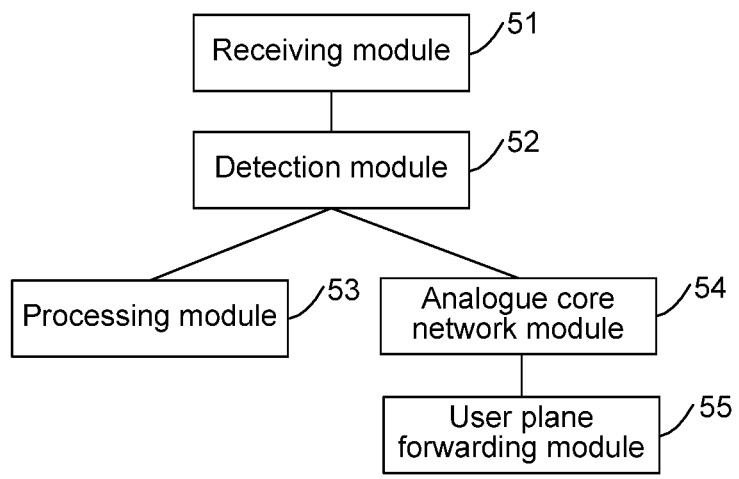
FIG. 8 is a structure diagram of another base station according to an embodiment of the disclosure.

FIG. 8 is a structure diagram of another base station according to an embodiment of the disclosure. Compared with FIG. 5, the base station of the embodiment further includes a user plane forwarding module 55. The user plane forwarding module 55 is connected with the analogue core network module 54, and the user plane forwarding module 55 is configured to forward a message of a speaking user to at least one listening user.

In the embodiments of the disclosure, the user plane forwarding module 55 in the base station may be implemented by the CPU, the DSP or the FPGA in the base station during the practical application.

Related contents in a system, terminal, base station and core network of the embodiments of the disclosure may be understood with reference to corresponding contents in related parts of the method and the like, and will not be elaborated herein.

The embodiment of the disclosure further provides a system for a full call in a broadband trunking system including any above-mentioned terminal and any above-mentioned base station. For the terminal and base station in the system, see related contents about the terminal and the base station in the specification of the disclosure which are not elaborated herein.

The disclosure will be explained and described below with some specific examples in detail.

Under a system-soft condition, a terminal initiates a full call request to a base station, with the full call request carrying a full call group No., and the base station sends to all terminals a paging message carrying the full call group No., for establishing a full call, establishes a full call group of all terminals carrying the full call group No., sends a full call configuration message carrying the full call group No. to the terminals in the full call group, and establishes a full call between the terminals in the full call group.

As a specific implementation, under the system-soft condition (such as the condition that the base station and a core network are disconnected), the terminal initiates the full call request to the base station, with the full call request carrying the full call group No., the base station sends the paging message and full call configuration message carrying the full call group No. to the corresponding terminals (because of disconnection from the core network, the terminals are all terminals under the base station), the terminal compares the full call group No. in the paging message with its own full call group No., and feeds back a response message to the base station if they are consistent and a paging response is required to be returned, and the base station establishes the full call group after receiving the response message, sends the full call configuration message to each terminal in the full call group, and establishes the full call between all the terminals set with the full call group No. under the base station; and if they are inconsistent, no paging response message is required to be returned, the full call configuration message is directly received, the full call between all the terminals set with the full call group No. under the base station is established, otherwise an ordinary group call flow is executed if the full calls are inconsistent.

Of course, those skilled in the art may also set the step of judging whether the full call group Nos. are consistent in a full call configuration message process. That is, when the terminal receives the paging message, the terminal judges whether the full call group Nos. are consistent and feeds back the response message if they are consistent. Judging whether to return the paging response message in a paging process may establish the full call group faster, so that whether the full call group Nos. are consistent is further judged after the paging request message is received in the embodiment of the disclosure. That is, after receiving the paging message, the terminal judges whether the full call group No. carried in the paging message is consistent with its own full call group No., and if they are consistent, directly receives the full call configuration message and establishes the full call group, otherwise executes a normal group call flow.

Figure 9:
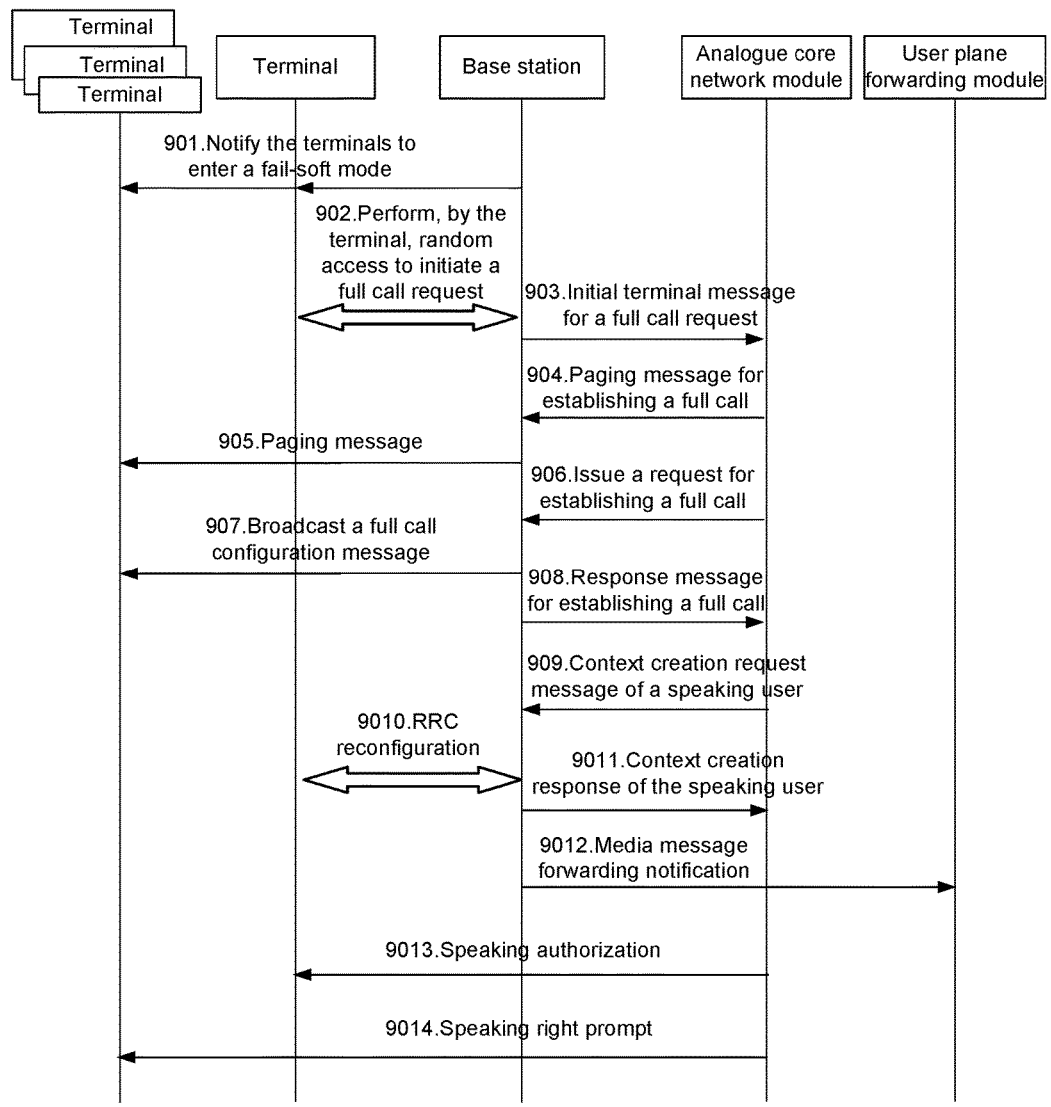
FIG. 9 is a flowchart of initiating a full call by a terminal in a fail-soft scenario according to an embodiment of the disclosure.

FIG. 9 is a flowchart of initiating a full call by a terminal in a fail-soft scenario according to an embodiment of the disclosure. As shown in FIG. 9, when a terminal initiates a full call, if a base station is disconnected from a core network or under another system-soft condition, the terminal interacts with the base station to implement a full call between terminals. A specific flow is as follows.

At Step 901: the base station detects that its port connected with the core network fails and interrupts, and notifies the terminals to enter a fail-soft mode.

At Step 902: a calling terminal (any terminal set with a full call group No.) initiates a full call request to the base station, with the full call request carrying the full call group No.

At Step 903: the base station sends an initial terminal message for a full call request to an analogue core network module (a newly added module inside the base station) according to a current state.

At Step 904: the analogue core network module decides that it is the full call group No., and initiates a paging message for establishing a full call to the base station, with the paging message carrying the full call group No.

At Step 905: the base station issues, through an air interface, a paging message for a Uu interface, with the message carrying the full call group No., and an identifier indicating whether a paging response is required to be returned.

Here, the Uu interface is an air interface of a Universal Mobile Telecommunications System (UMTS), and connects User Equipment (UE) to a base station controller of the UMTS.

At Step 906: the analogue core network module initiates a request for establishing a full call to the base station.

At Step 907: the base station allocates a full call establishment resource, and broadcasts a full call configuration message to the terminals through the air interface.

At Step 908: the base station sends a response message for establishing a full call to the analogue core network module so as to notify the analogue core network module that the full call is successfully established.

At Step 909: the analogue core network module sends a context creation request message of a speaking user to the base station.

In the embodiment, the speaking user refers to a calling user.

At Step 9010: the base station and the terminal implement Radio Resource Control (RRC) air interface reconfiguration and establish a carrying resource of the speaking user.

At Step 9011: the base station sends a context creation response message of the speaking user to the analogue core network module so as to indicate successful establishment of the speaking user.

At Step 9012: the base station notifies a user plane forwarding module to forward a message of the speaking user to listening users.

In the embodiment, the listening users refer to called users.

At Step 9013: the analogue core network module sends a speaking authorization to the calling terminal.

At Step 9014: the analogue core network module broadcasts a speaking right prompt to the other users, the full call enters a talking state, and the calling terminal may issue a scheduling instruction.

That is, in the embodiment, the analogue core network module sends a paging message for establishing the full call to the terminals through the base station, thereby learning about the terminals set with the full call group No. and establishing a full call group, and then the analogue core network module sends the full call configuration message to the terminals through the base station, thereby establishing the full call between all the terminals set with the full call group No. under the base station.

In the embodiment of the disclosure, the step that the terminal initiates the full call request to the base station, with the full call request carrying the full call group No., and the base station establishes the full call between corresponding terminals according to the full call group No. together with the core network specifically includes the following contents.

when the system is normal, the terminal initiates the full call request to the base station, with the full call request carrying the full call group No., the base station sends the full call request to the core network, and the core network sends the paging message carrying the full call group No., for establishing a full call, to all the terminals through the base station, establishes the full call group of all the terminals carrying the full call group No., sends the full call configuration message carrying the full call group No. to the terminals in the full call group through the base station, and establishes the full call between the terminals in the full call group.

Figure 10:
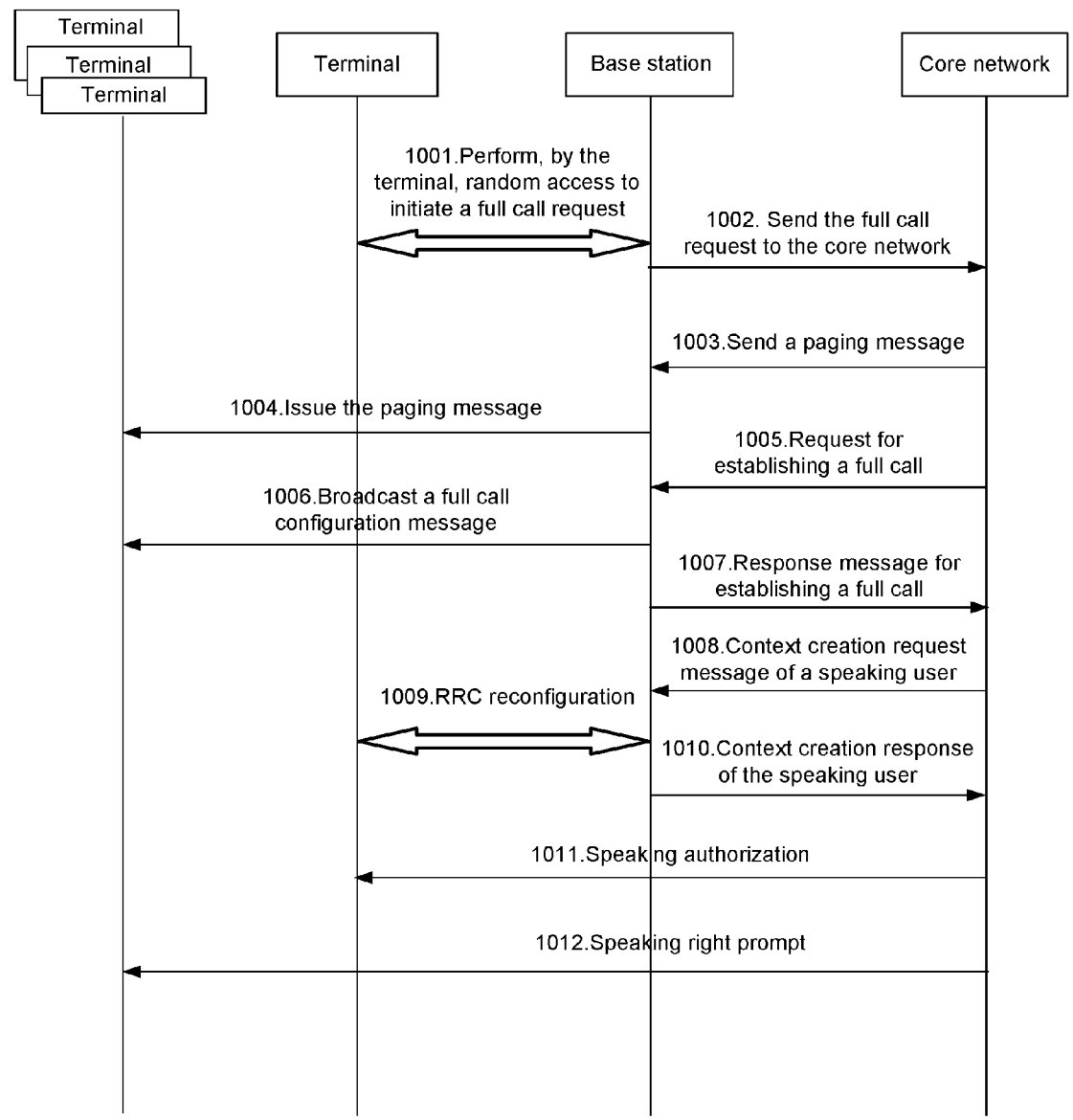
FIG. 10 is a flowchart of initiating a full call by a terminal when a system is normal according to an embodiment of the disclosure.

FIG. 10 is a flowchart of initiating a full call by a terminal in a case of a normal system according to an embodiment of the disclosure. As shown in FIG. 10, in a case that the system is normal, a specific flow of initiating the full call by the terminal mainly includes the following steps.

At Step 1001: a calling terminal initiates a full call request, with the full call request carrying a full call group No.

At Step 1002: a base station sends the full call request to a core network according to a current state.

At Step 1003: the core network initiates a paging message to the base station, with the paging message carrying the full call group No.

At Step 1004: the base station issues the paging message through an air interface.

At Step 1005: the core network initiates a request for establishing a full call to the base station, with the request carrying the full call group No.

At Step 1006: the base station allocates a full call establishment resource, and broadcasts, through its air interface, a full call configuration message to an air interface of the terminal.

At Step 1007: the base station sends a response message for establishing a full call fed back by the terminal to the core network.

At Step 1008: the core network sends a context creation request message of the calling terminal to the base station.

At Step 1009: the base station and the terminal complete air interface RRC reconfiguration and establish a carrying resource of a speaking user.

At Step 1010: the base station sends a context creation response message to the core network so as to indicate successful establishment of the speaking user.

At Step 1011: the core network sends a speaking authorization to the calling terminal.

At Step 1012: the core network broadcasts a speaking right prompt to other users, the group call enters a talking state, and the calling terminal may issue a scheduling instruction.

In the disclosure, the full call may also be initiated through the core network. Specifically, the core network sends the paging message carrying the full call group No., for establishing a full call, to all the terminals through the base station; establishes a full call group of the terminals carrying the full call group No.; sends a full call configuration message carrying the full call group No. to the terminals in the full call group through the base station; and establishes the full call between the terminals in the full call group.

Figure 11:
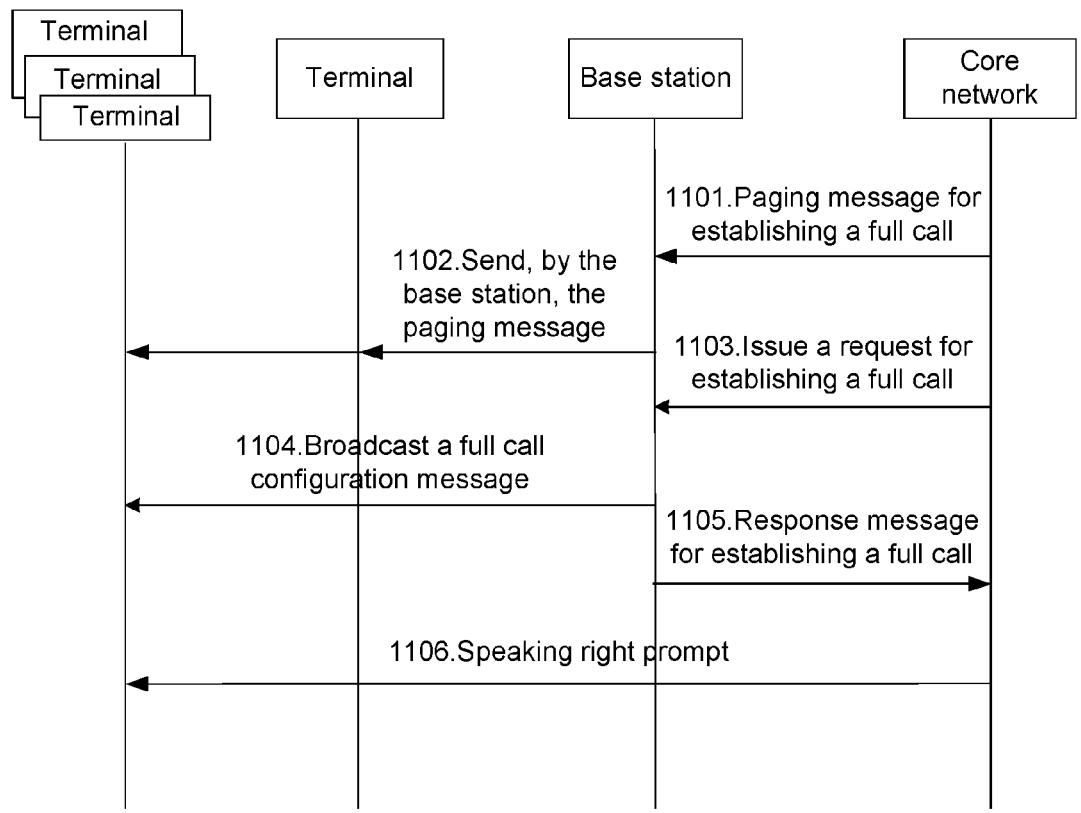
FIG. 11 is a flowchart of initiating a full call by a core network according to an embodiment of the disclosure.

FIG. 11 is a flowchart of initiating a full call by a core network according to an embodiment of the disclosure. As shown in FIG. 11, a specific flow of initiating the full call by the core network mainly includes the following steps.

At Step 1101: the core network selects a full call group No., and issues a paging message for establishing a full call to all base stations.

At Step 1102: the base stations periodically issue the paging message under the base stations after receiving a full call request.

At Step 1103: the core network initiates a request for establishing a full call to the base stations, with the request carrying the full call group No.

At Step 1104: the base stations allocate full call establishment resources, and broadcast, through their air interfaces, full call configuration messages to air interfaces of terminals.

At Step 1105: the base stations send response messages for establishing a full call to the core network.

At Step 1106: the core network broadcasts a speaking right prompt to other users, and after establishment of a full call service channel is completed, the full call enters a talking state, a core network side may issue a scheduling instruction.

From the above, the technical solutions of the embodiments of the disclosure may at least achieve the following beneficial effects.

By setting the full call group No. on the terminal, and in an emergency, establishing by the terminal the full call between the terminals according to the full call group No. through the base station itself or by the base station together with the core network, the unified scheduling of all legal users in the entire network system is achieved and a scheduling capability of trunking is utilized more effectively.

What are mentioned above are only specific embodiments of the disclosure and are not intended to limit the scope of protection of the disclosure. Any variations or replacements apparent to those skilled in the art within the technical scope of the disclosure shall fall within the scope of protection of the disclosure. Therefore, the scope of protection of the disclosure shall be subject to the scope of protection of the claims.

INDUSTRIAL APPLICABILITY

In the embodiments of the disclosure, the terminal set with the full call group No. initiates a full call request carrying the full call group No. to a base station, so as to cause the base station to establish the full call between the terminal and at least one other terminal with the full call group No. In such a manner, the unified scheduling of all legal users in the entire network system is achieved and a scheduling capability of trunking is utilized more effectively.

What is claimed is:

1. A method for performing an all call, applied in a broadband trunking system, comprising:
   receiving, by a base station, an all call request, sent by a terminal set with an all call group number and carrying the all call group number, and then detecting whether a port of the base station, which is connected with a core network, is normally connected;
   when the port is normally connected:
      sending, by the base station, the all call request to the core network;
      receiving, by the base station, a paging message carrying another all call group number for establishing the all call, from the core network;
      sending, by the base station, the paging massage to the terminal and receiving a response message from the terminal when the terminal determines that the another all call group number in the paging message is consistent with the all call group number in the terminal;
      establishing, by the base station, an all call group of all the terminals with the all call group number; and
      receiving, by the base station, a request for establishing an all call carrying the all call group number from the core network, and establishing, by the base station, the all call between the terminals in the all call group; and
   when the port is not normally connected:
      sending, by the base station, to all terminals a paging message carrying another all call group number for establishing the all call;
      receiving response messages from the all terminals when the terminals determine that the another all call group number in the paging message is consistent with the all call group number in the terminals; and
      establishing an all call group of all the terminals with the all call group number;
   sending an all call configuration message carrying the all call group number to the terminals in the all call group, and establishing the all call between the terminals in the all call group.

2. A non-transitory computer readable storage medium in which computer executable instructions are stored for execution of the method according to claim 1.

3. A base station for performing an all call, applied in a broadband trunking system, comprising:
   one or more processors configured to execute computer readable instructions for executing a method, the method comprising:
      receiving, by a base station, an all call request, sent by a terminal set with an all call group number and carrying the all call group number, and then detecting whether a port of the base station, which is connected with a core network, is normally connected;
      when the port is normally connected:
         sending, by the base station, the all call request to the core network;
         receiving, by the base station, a paging message carrying another all call group number for establishing the all call, from the core network;
         sending, by the base station, the paging massage to the terminal and receiving a response message from the terminal when the terminal determines that the another all call group number in the paging message is consistent with the all call group number in the terminal;

establishing, by the base station, an all call group of all the terminals with the all call group number; and receiving, by the base station, a request for establishing an all call carrying the all call group number from the core network, and establishing, by the base station, the all call between the terminals in the all call group; and when the port is not normally connected:

sending, by the base station, to all terminals a paging message carrying another all call group number for establishing the all call;

receiving response messages from the all terminals when the terminals determine that the another all call group number in the paging message is consistent with the all call group number in the terminals; and establishing an all call group of all the terminals with the all call group number; sending an all call configuration message carrying the all call group number to the terminals in the all call group, and establishing the all call between the terminals in the all call group.

4. A system for performing an all call, applied in a broadband trunking system, comprising the terminal according to claim 2 and a base station, wherein the base station comprises one or more processors executing computer readable instructions for:

receiving the all call request, which is initiated by the terminal set with the all call group number and carries the all call group number;

detecting whether a port of the base station, which is connected with a core network, is normally connected;

when the port is normally connected:

sending, by the base station, the all call request to the core network;

receiving, by the base station, a paging message carrying another all call group number for establishing the all call, from the core network;

sending, by the base station, the paging massage to the terminal and receiving a response message from the terminal when the terminal determines that the another all call group number in the paging message is consistent with the all call group number in the terminal;

establishing, by the base station, an all call group of all the terminals with the all call group number; and receiving, by the base station, a request for establishing an all call carrying the all call group number from the core network, and establishing, by the base station, the all call between the terminals in the all call group; and when the port is not normally connected:

sending, by the base station, to all terminals a paging message carrying another all call group number for establishing the all call;

receiving response messages from the all terminals when the terminals determine that the another all call group number in the paging message is consistent with the all call group number in the terminals; and establishing an all call group of all the terminals with the all call group number; sending an all call configuration message carrying the all call group number to the terminals in the all call group, and establishing the all call between the terminals in the all call group.

\* \* \* \* \*